United States Patent [19]

Tyebkhan

[11] Patent Number: 4,985,604
[45] Date of Patent: Jan. 15, 1991

[54] ROLAMITE SENSOR

[75] Inventor: Yosufi M. Tyebkhan, San Dimas, Calif.

[73] Assignee: TRW Technar Inc., Irwindale, Calif.

[21] Appl. No.: 419,013

[22] Filed: Oct. 10, 1989

[51] Int. Cl.$^5$ .............................................. H01H 1/16
[52] U.S. Cl. .................................................. 200/503
[58] Field of Search ...................... 200/503, 277, 61.53

[56] References Cited

U.S. PATENT DOCUMENTS

| | | | |
|---|---|---|---|
| 3,452,175 | 6/1969 | Wilkes | 200/503 |
| 3,471,668 | 10/1969 | Wilkes | 200/503 |
| 3,643,048 | 2/1972 | Crow et al. | 200/503 |
| 3,643,049 | 2/1972 | Lu Conic et al. | 200/503 |
| 3,672,325 | 6/1972 | Harrah | 116/268 |
| 3,812,726 | 5/1974 | Bell | 73/503 |
| 3,848,695 | 11/1974 | Lacaze, Jr. | 200/503 X |
| 4,167,276 | 9/1979 | Bell et al. | 200/61.53 |

OTHER PUBLICATIONS

Prior Art Sensor Shown on the Attached Drawing.

Primary Examiner—Renee S. Luebke
Attorney, Agent, or Firm—Tarolli, Sundheim & Covell

[57] ABSTRACT

A rolamite sensor includes a formed sheet metal base attached to a metal chassis. One surface of the sheet metal base acts as a guide surface for a roller. A thin metal foil band is wrapped around the roller and has its ends welded to the base underneath the base. The roller is biased into a first position and is rollable on the guide surface from its first position under an applied force to cause the band to engage a firing contact. A single pin connected to the firing contact extends through the chassis and is electrically insulated from the chassis. The pin and chassis are connected to opposite electric potentials in the vehicle. When the band engages the firing contact, an electrical circuit is completed through the pin, the firing contact, the band, the base, and the chassis to activate a vehicle safety apparatus. The sheet metal base includes a calibration tab which sets the first position of the roller along the guide surface. The tab may be physically bent to select the distance through which the roller needs to travel to complete the electrical circuit.

22 Claims, 3 Drawing Sheets

U.S. Patent    Jan. 15, 1991    Sheet 1 of 3    4,985,604
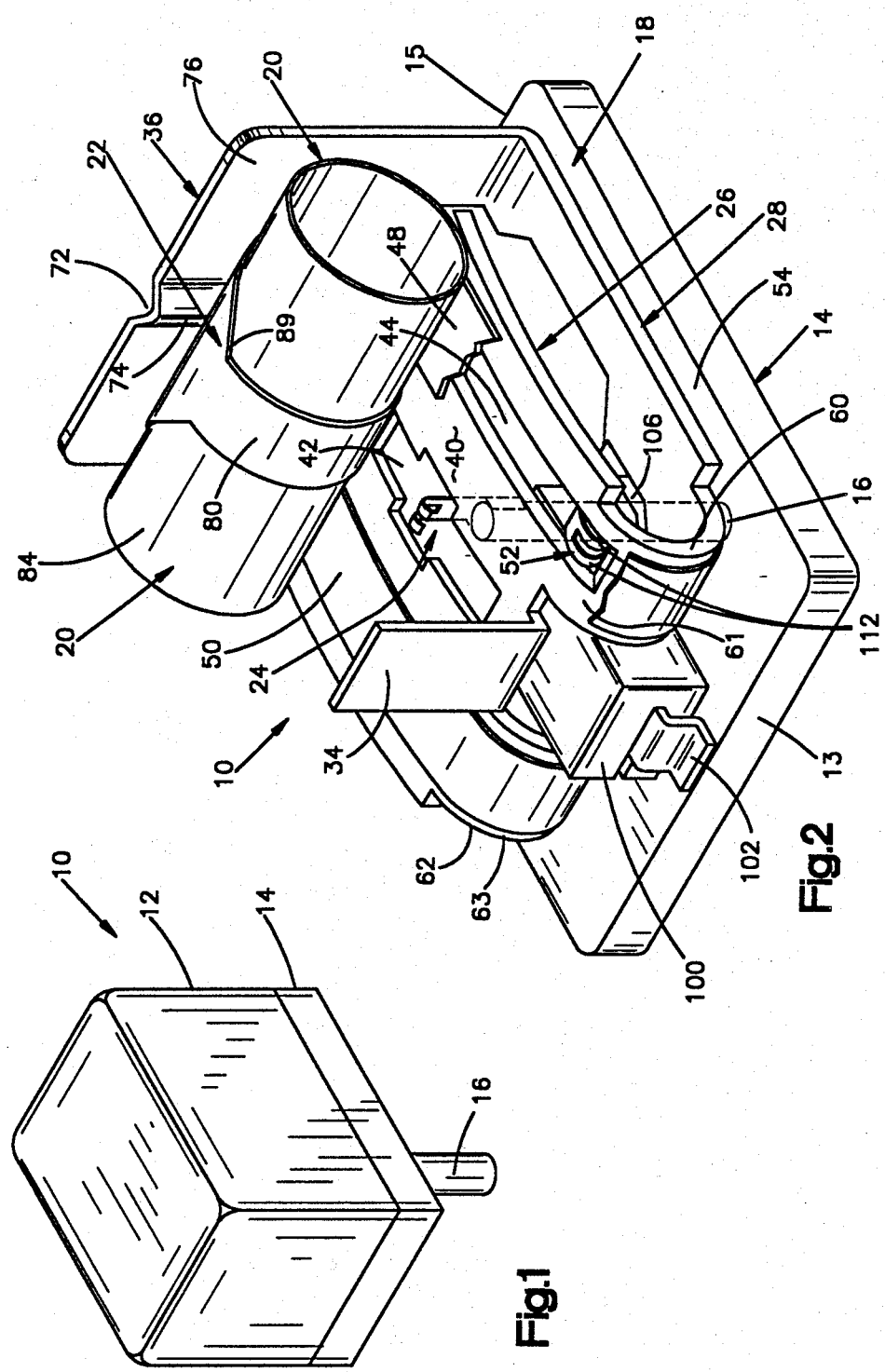

ROLAMITE SENSOR

BACKGROUND OF THE INVENTION

1. Technical Field

The present invention relates to a rolamite sensor. More particularly, the present invention relates to a rolamite sensor for use in sensing deceleration of a vehicle to actuate an occupant restraint such as an air bag.

2. Description of the Prior Art

Rolamite sensors for use in sensing vehicle deceleration are known. U.S. Pat. No. 3,643,049 to LuConic et al. discloses a rolamite sensor having a roller with a band wrapped around the roller. The band includes a first longitudinal portion attached to a base and a second longitudinal portion having spaced apart legs that extend away from the first portion and are also attached to the base. The cross sectional area of the legs is greater than the cross sectional area of the first band portion so that the band biases the roller toward the first band portion to an initial position away from an electrical contact. Excessive vehicle deceleration causes the roller to roll along the base, against the biasing force of the band, into engagement with the electrical contact, completing an electrical circuit.

Another prior art rolamite sensor includes a molded base mounted on a chassis. Two electrical connector pins are attached to the chassis. One end of a band is attached to the upper surface of the base and the other end of the band is attached to a tensioner. The band is wrapped around a roller. The tensioner applies a force to the band to hold the roller on the base. When subjected to excessive vehicle deceleration, the roller rolls along the base causing the band to engage a firing contact. Electrical current flows between one pin of the chassis and the other pin through the firing contact and the band when the band engages the firing contact, thereby completing an electrical circuit to activate a vehicle safety apparatus.

SUMMARY OF THE INVENTION

The present invention is a rolamite sensor which includes a formed sheet metal base attached to a metal chassis. One surface of the sheet metal base acts as a guide surface for a movable member, such as a roller. A thin metal foil band is wrapped around the roller and has its ends welded to the base underneath the base. The band has different cross-sectional areas on opposite sides of the roller so that the roller is biased into a first position. The roller is rollable on the guide surface away from its first position under excessive vehicle deceleration to cause the band to engage a firing contact.

A single electrically conductive pin extends through the chassis and is electrically insulated from the chassis. The pin is connected to the firing contact. When the band engages the firing contact, current passes through the pin, the firing contact, the band, the base, and the chassis. Thus, an electrical circuit is completed to activate a vehicle safety apparatus such as an airbag or a seat belt pretensioner.

The sheet metal base includes a calibration tab which sets the first position of the roller along the guide surface. The band biases the roller against the calibration tab. The calibration tab serves as a backstop for the roller and may be physically bent to select the distance through which the roller travels to complete the electrical circuit. Thus, the sensor may be calibrated to provide a desired sensitivity.

The preferred embodiment of the present invention does not include a band tensioner. The preferred embodiment of the sensor can also be substantially smaller than the prior art sensors, since the base and chassis form part of the electrical circuit and since the tensioner is eliminated. Also, because the metal band is welded underneath the base, forces applied to the weld, for example if the sensor is accidentally dropped, are shear forces which the weld can readily resist.

BRIEF DESCRIPTION OF THE DRAWINGS

Further features of the present invention will become apparent to those skilled in the art to which the present invention relates from reading the following specification with reference to the accompanying drawings, in which:

FIG. 1 is an exterior view of a sensor embodying the present invention;

FIG. 2 is a perspective view of the sensor of FIG. 1 with the cover and other parts removed and some parts shown in phantom;

DESCRIPTION OF A PREFERRED EMBODIMENT

Figure 3:
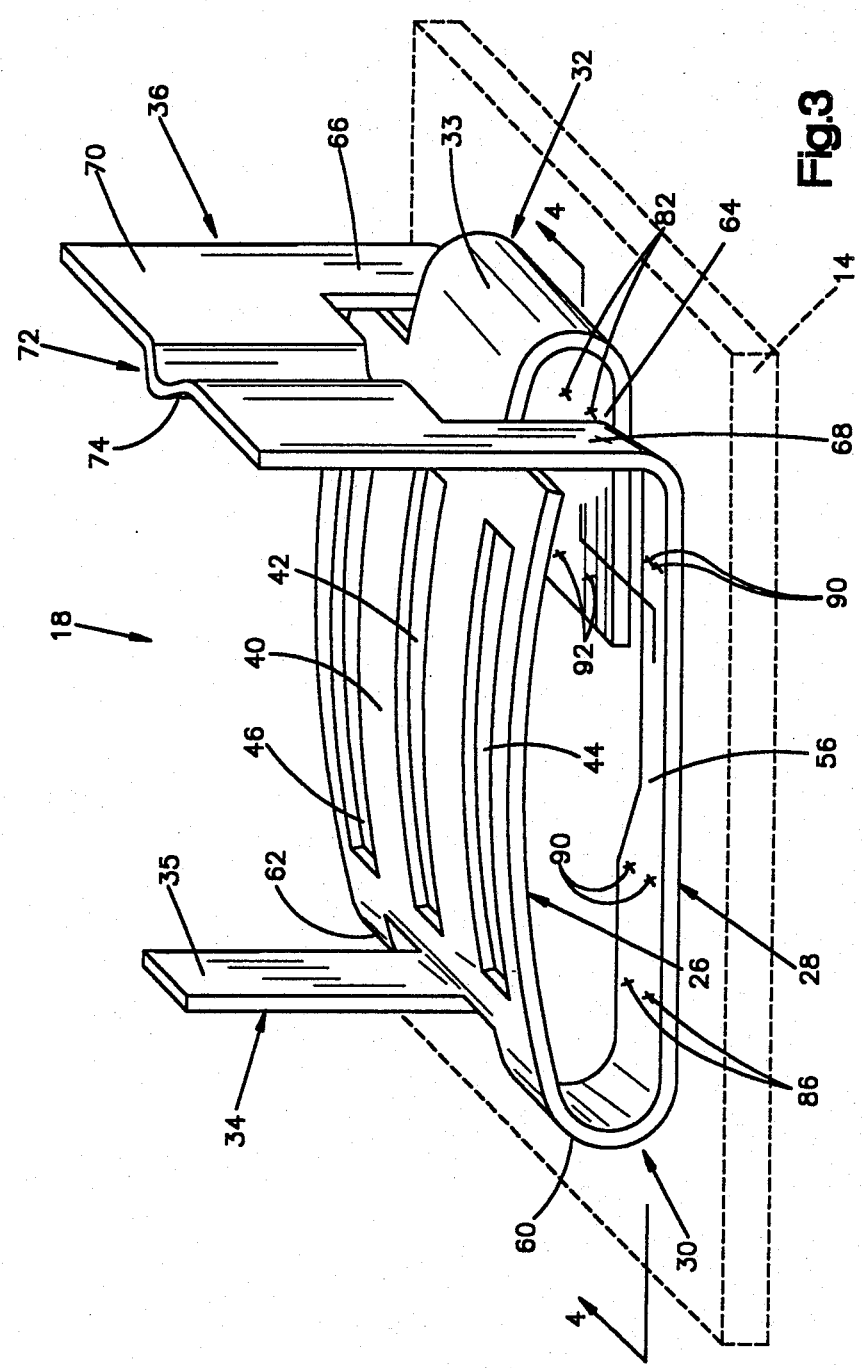
FIG. 3 is a perspective view of the sheet metal base of the sensor of FIG. 1.

The sensor 10 (FIG. 1) includes a cover 12 and a chassis 14. The chassis 14 is a metal plate having a generally rectangular shape. The cover 12 is a thin wall metal enclosure which is preferably laser welded to the chassis 14 and encloses the other parts of the sensor 10 in a hermetically sealed inert atmosphere which is preferably 90%–95% nitrogen and 5%–10% helium. A single electrical contact pin 16 projects from and is electrically insulated from the chassis 14. The pin 16 is attached to one electrical potential in a vehicle and the chassis 14 is attached to the opposite electrical potential. Inside the cover 12 is a base 18 attached to the chassis 14. A roller 20 is mounted on the base by a band 22 which is wrapped around the roller 20 and has its ends welded to the base. A firing contact secured to the chassis projects through the base to be contacted by the roller, as will be described below.

The base 18 is formed from one piece of sheet metal. The base 18 is preferably made of No. 304 annealed stainless steel, and is about 0.5 mm thick. As best seen in FIG. 3, the base 18 has a first base portion 26 spaced from a second base portion 28. A curved third portion 30 of the base, at the left end of the base 18, as viewed in FIG. 3, extends between and connects the first portion 26 with the second portion 28. A curved fourth portion 32 of the base 18, at the right end of the base 18, as viewed in FIG. 3, extends from the right end of the first portion 26 and connects the portion 26 with the chassis 14.

The surface of the first base portion 26 facing away from the chassis 14 and away from the second base portion 28 is a curved guide surface 40 which defines a path for rolling movement of the roller 20. A first slot 42 extends longitudinally centrally along the first base portion 26. A firing contact 24 (FIG. 2) extends through the slot 42 above the guide surface 40, into the path of rolling movement of the roller 20. A pair of second slots 44 and 46 extend longitudinally along the first base portion 26 parallel to, but spaced from, the slot 42.

The second base portion 28 includes two spaced-apart legs 56 that are generally parallel to each other. A first leg 56 extends along one side of the base 18, and a second leg (not shown) extends along the opposite side of the base 18. Each leg 56 is welded to the surface 54 of the chassis 14 at locations 90 (FIGS. 3 and 4) to attach the base 18 to the chassis 14.

The curved third portion 30 of the base 18 includes a leg 60 on one side of the base 18 and a leg 62 on the opposite side of the base 18. The leg 60 has a curved outer surface 61, and the leg 62 has a curved outer surface 63. The surfaces 61 and 63 merge into the guide surface 40 of the first base portion 26. The legs 60 and 62 support the left end of the first base portion 26 in position spaced from the chassis 14. Each of the legs 60 and 62 joins a different leg 56 of the second portion 28 of the base.

Figure 4:
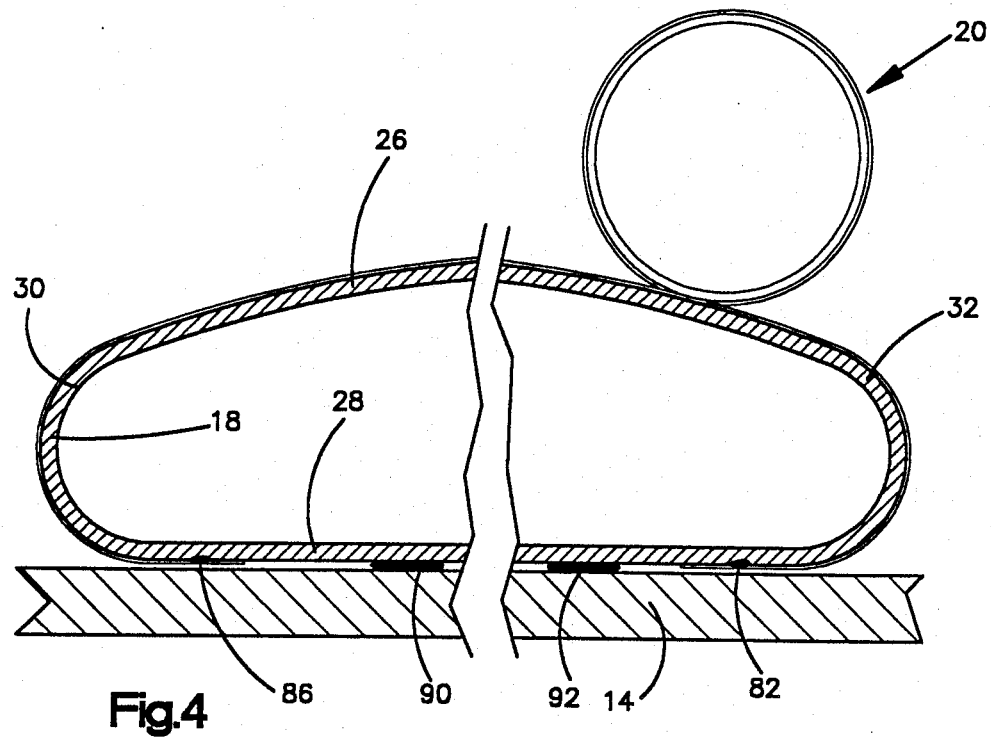
FIG. 4 is a longitudinal sectional view taken along section line 4—4 of FIG. 3 with a roller and a band of exaggerated thickness added.

The curved fourth base portion 32 extends between the right end of the first base portion 26 and the right end of the chassis 14. The curved fourth base portion 32 supports the right end of the first base portion 26 in position spaced from the chassis 14. A portion 64 of the curved fourth base portion 32 is welded to the chassis 14 at two locations 92 (FIGS. 3 and 4). A curved outer surface 33 of the fourth base portion 32 merges into the guide surface 40 of the first base portion.

A front stop 34 extends from the first portion 26 of the base 18 in a direction generally perpendicular to the chassis 14. The front stop 34 is preferably formed from the same piece of sheet metal as the base 18 by cutting the stop from the center of the curved third portion of the base, between legs 60 and 62, and bending it away from the third portion. A surface 35 on the front stop 34 faces the right end of the base 18, as viewed in FIG. 3.

A calibration tab or backstop 36 extends from the second base portion 28 away from the chassis 14. Like the front stop 34, the calibration tab 36 is preferably from the same piece of sheet metal as the base 18. The calibration tab 36 includes two parallel legs 66 and 68 spaced from each other on opposite sides of the fourth base portion 32. The legs 66 and 68 are joined to different legs 56 of the second base portion 28. A planar portion 70 connects the legs 66 and 68 above the guide surface 40 of the first base portion 26. A dimple or projecting portion 72 on the calibration tab 36 extends along the planar portion 70 parallel to the legs 66 and 68 and projects outwardly from the planar portion 70 toward the roller 20 and the front stop 34. A front surface 74 on the dimple 72 is disposed closer to the left end of the base 18 than any other portion of the calibration tab 36. This surface 74 provides point contact between the roller 20 and the calibration tab 36 so that the position of the roller 20 can be precisely set. The dimple 72 engages the roller 20 rather than the band 22 in order to avoid imprecise roller positioning which might occur if, for example, the band did not lie flat against the roller at the point of contact. Alternatively, the calibration tab could comprise a projection offset from the center of the base 18. In this case, the dimple would be formed on a planar portion of the projection and the point contact between the roller 20 and the projection would be at a point offset from the center of the roller 20.

The band 22 biases the roller 20 into a first position as shown in FIG. 2 along the guide surface 40. In the position as shown in FIG. 2, the roller 20 abuts the front surface 74 of the calibration tab 36. The band 22 is made of a flexible electrically conductive material. The band is preferably made of a beryllium nickel alloy and is about 0.03 mm thick. The band 22 secures the roller 20 for rolling movement relative to the base 18.

A narrow tongue portion 80 of the band extends longitudinally along and overlies the curved outer surface 33 of the fourth base portion 32 and extends to the guide surface 40 of the first base portion 26. The tongue portion 80 of the band 22 then curves upwardly and back and wraps around the outer cylindrical surface 84 of the roller 20 as seen in FIG. 2. The end of the tongue portion 80 of the band 22 is welded to the base 18 at two locations 82 (FIGS. 3 and 4) spaced laterally across from each other underneath the fourth base portion 32. The end of the band is between the weld locations 82 and 92.

Midway along its length, the band 22 widens from the width of the tongue portion 80, as indicated at 89 in FIG. 2 and splits to form two spaced-apart and parallel leg portions 48 and 50 between which portions the roller 20 contacts the dimple 72. The two band portions 48 and 50 complete the wrap around the roller 20 begun by the tongue portion 80 and extend along the guide surface 40 of the first base portion 26 to the left end of the base 18. The band portion 48 wraps around the curved outer surface 61 of the leg 60 of the third base portion 30, extends between one of the legs 56 of the second base portion and the chassis 14 and is welded to the base 18 at two locations 86 (FIGS. 3 and 4). The band portion 50 on the opposite side of the sensor 10 wraps around the curved outer surface 63 of the leg 62 of the third base portion 30, extends between a second leg 56 of the second base portion 28 and the chassis 14, and is welded to the base 18 at two weld locations on the other side of the base 18 from the locations 86. The ends of the band portions 48 and 50 are between the weld locations 86 and 90. Because the metal band 22 is welded underneath and not on top of the base 18, forces applied to the weld, which would tend to pull the roller 20 away from the guide surface 40 and so tension the band, are shear forces which the welds can readily resist. Such forces are encountered in the field in vibration environments and, for example, if the sensor is accidentally dropped.

The band portions 48 and 50 extend over the slots 44 and 46 respectively (FIG. 2). The slots 44 and 46 reduce the contact area between the band 22 and the base 18. This minimizes the chance of particles accumulating between the band 22 and the base 18 and disrupting the rolling movement of the roller 20. The slot 44 also allows a diagnostic contact 52 to extend through the first base portion 26 above the guide surface 40 into contact with the band portion 48.

In a preferred embodiment, the sensor 10 is mounted in the vehicle such as an automobile with the roller 20 and band 22 in the position illustrated in FIG. 2 with the roller 20 in contact with the calibration tab 36. The combined cross-sectional area of the two band portions 48 and 50 is greater than the cross-sectional area of the band tongue portion 80, so that the band biases the roller 20 toward the calibration tab 36. If the sensor 10 is to sense deceleration of a vehicle moving forward, the left end 13 of the sensor 10 will be mounted toward the front of the vehicle and the right end 15 of the sensor 10 will be mounted toward the rear of the vehicle. Deceleration of the vehicle at a sufficient rate for a long enough time interval causes the roller 20 to roll along the guide surface 40 of the base 18 away from the calibration tab 36 against the bias of the band 22. If the roller 20 rolls far enough away from the calibration tab 36, the tongue portion 80 of the band contacts the firing contact 24 which extends through the guide surface 40. Since the firing contact 24 and the band 22 are both made of electrically conductive metal, an electrical current can then flow between the firing contact 24 and the band 22. Such an electrical current flow can be used, for example, to trigger a vehicle occupant restraint system such as an airbag.

Figure 5:
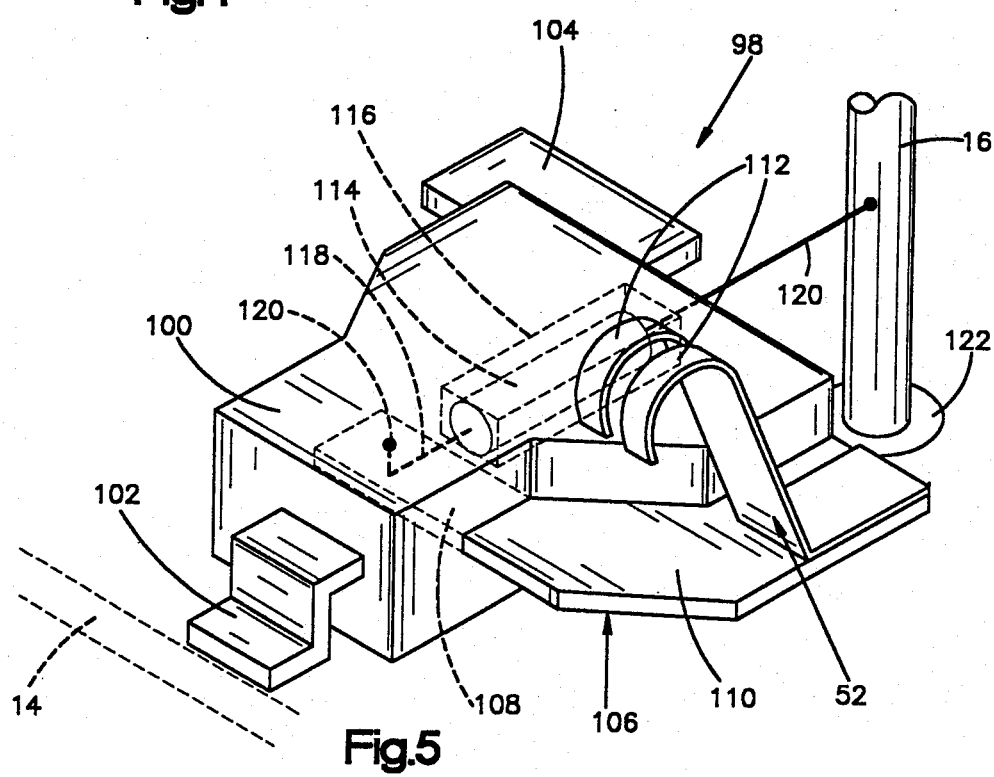
FIG. 5 is a perspective view illustrating the diagnostic assembly of the sensor.

The sensor 10 may include in one embodiment a diagnostic assembly 98 shown in FIG. 5. The diagnostic assembly 98 includes an interconnect 100. The interconnect 100 is located between the legs 60 and 62 of the third portion 30 of the base 18 and the legs 56 of the second base portion 28. The end of the interconnect 100 that projects from the base 18 is attached to the chassis 14 by a leg 102. The other or back end of the interconnect 100 is attached to the chassis 14 by a leg 104. The interconnect 100 is made of an electrically insulating material. As shown in FIG. 5, a metal flange 106 is fixed in the interconnect 100. The flange 106 is electrically insulated, by the material of the interconnect 100, from the legs 102 and 104. The flange 106 has an internal flange portion 108 in the interconnect 100 and an external flange portion 110 that projects from the interconnect. The diagnostic contact 52 is attached to the external flange portion 110. The diagnostic contact 52 is made of a flexible, electrically conductive material, such as metal. One end of the diagnostic contact 52 is fixed to the flange portion 110. The other end of the diagnostic contact 52 projects away from the flange portion 110 and includes a pair of flexible diagnostic fingers 112. The fingers 112 contact the leg portion 48 of the band 22.

A resistor 114 is located in a cavity 116 within the interconnect 100. One lead 118 of the resistor 114 is attached to the internal flange portion 108 at a connection point 120. The other lead 120 of the resistor 114 extends outwardly from the back end of the interconnect 100 and is connected to the pin 16. The pin 16 is electrically insulated from the chassis 14 by an electrical insulator 122. Accordingly, an electrical diagnostic circuit is formed through which electrical current can flow between the pin 16 and the band 22. The diagnostic circuit includes the pin 16, the resistor 114, the flange 106, the diagnostic contact 52, and the diagnostic contact fingers 112, and the band 22. In normal operation of the sensor 10, a small current of a value significantly less than that required to actuate a vehicle safety apparatus flows through the diagnostic circuit to test the integrity of the sensor 10. If the band 22 breaks at any point, the band portion 48 will pull away from the diagnostic contact fingers 112, and the diagnostic circuit will be broken. The resulting open circuit condition can be used to trigger a suitable alarm to indicate that the sensor is inoperative.

If the diagnostic assembly 98 is not included in the sensor 10, then a resistor such as the resistor 114 may be electrically connected between the pin 16 and the chassis 14. This arrangement allows for a constant small current flow through the resistor indicating the presence of the sensor 10 in the electrical circuitry of the vehicle, and serves to test the integrity of the electrical connections of the sensor 10 to the vehicle circuitry.

From the above description of a preferred embodiment of the invention, those skilled in the art will perceive improvements, changes, and modifications therein. Such improvements, changes, and modifications within the skill of the art are intended to be covered by the appended claims.

I claim:

1. An apparatus comprising:
   a movable member;
   an electrically conductive sheet metal base having a guide surface thereon defining a path for movement of said movable member, said movable member being movable along said guide surface from a first position due to a force acting on said movable member;
   a band of flexible, electrically conductive material at least partially encircling said movable member, said band extending in opposite directions away from said movable member and having opposite ends connected to said base; and
   an electrically conductive member at a location spaced from said movable member when said movable member is in said first position and in the path of movement of said movable member;
   said movable member being movable along said guide surface from said first position to a second position in which a portion of said band contacts said conductive member to complete a circuit for electrical current through said conductive member, said band, and said sheet metal base.

2. An apparatus as defined in claim 1 wherein said movable member comprises a roller which is rollable along said guide surface.

3. An apparatus as defined in claim 1 wherein said band is welded to said base at a location such that a force acting to pull said movable member and said band away from said base tensions said band and applies shear forces to said weld.

4. An apparatus as defined in claim 2 further comprising a chassis to which said base is attached,
   said base comprising first and second base portions spaced from each other,
   said first base portion having said guide surface thereon facing away from said chassis and including means defining a first slot in said first base portion through which said conductive member extends into the path of rolling movement of said roller,
   said second base portion being fixed to said chassis and said band being secured to said second base portion,
   said base further comprising a curved third base portion connecting said first and second base portions at one end thereof, and a fourth base portion attached to the other end of said first base portion and fixed to said chassis.

5. An apparatus as defined in claim 4 further comprising means for diagnosing band breakage including an electrically conductive diagnostic contact, said base including means defining a second slot in said first base portion through which said diagnostic contact extends to contact said band.

6. An apparatus as defined in claim 2 wherein said base includes a calibration tab extending from said base and bendable relative to said base to at least partially define said first position of said roller.

7. An apparatus as defined in claim 6 wherein said calibration tab extends from said base and forms a backstop to block rolling movement of said roller in a first direction along said guide surface.

8. An apparatus as defined in claim 7 wherein said calibration tab comprises a planar portion and a portion projecting from said planar portion toward said roller to provide point contact between said roller and said calibration tab.

9. An apparatus as defined in claim 7 wherein said first and second base portions and said calibration tab are formed of one piece of sheet metal.

10. An apparatus comprising
a movable member;
a base having a guide surface thereon defining a path for movement of said movable member, said movable member being movable along said guide surface from a first position to a second position due to a force acting on said movable member;
a band of flexible, electrically conductive material at least partially encircling said movable member, said band extending in opposite directions away from said movable member along said guide surface;
an electrically conductive member at a location spaced from said movable member and from said band when said movable member is in said first position and in the path of movement of said movable member, said band having a portion which contacts said conductive member to complete a circuit for electrical current through said conductive member and said band when said movable member is in said second position;
a calibration tab projecting from said base and bendable relative to said base to at least partially define said first position of said movable member; and
said base being made of sheet metal and said calibration tab being formed in one piece with said base and extending from said base and forming a backstop to block movement of said movable member in a first direction along said guide surface.

11. An apparatus comprising:
a movable member;
a base having a guide surface thereon defining a path for movement of said movable member, said movable member being movable along said guide surface from a first position to a second position due to a force acting on said movable member;
a band of flexible electrically conductive material at least partially encircling said movable member, said band extending in opposite directions away from said movable member along said guide surface;
an electrically conductive member at a location spaced from said movable member and from said band when said movable member is in said first position and in the path of movement of said movable member, said band having a portion which contacts said conductive member to complete a circuit for electrical current through said conductive member and said band when said movable member is in said second position;
a calibration tab projecting from said base and bendable relative to said base to at least partially define said first position of said movable member; and
wherein said base is made of sheet metal and said band is welded to said base at a location such that a force acting to pull said movable member and said band away from said base tensions said band and applies shear forces to said weld.

12. An apparatus comprising
a movable member;
a base having a guide surface thereon defining a path for movement of said movable member, said movable member being movable along said guide surface from a first position to a second position due to a force acting on said movable member;
a band of flexible, electrically conductive material at least partially encircling said movable member, said band extending in opposite directions away from said movable member along said guide surface;
an electrically conductive member at a location spaced from said movable member and from said band when said movable member is in said first position and in the path of movement of said movable member, said band having a portion which contacts said conductive member to complete a circuit for electrical current through said conductive member and said band when said movable member is in said second position;
a calibration tab projecting from said base and bendable relative to said base to at least partially define said first position of said movable member; and
a chassis to which said base is attached,
said base comprising first and second base portions spaced from each other,
said first base portion being spaced from said chassis and having said guide surface thereon facing away from said chassis and having means defining a first slot in said first base portion through which said conductive member extends into the path of movement of said movable member,
said second base portion being fixed to said chassis and said band being secured to said second base portion,
said base further comprising a curved third base portion connecting said first and second base portions at one end thereof, and a fourth base portion attached to the other end of said first base portion and fixed to said chassis.

13. An apparatus as defined in claim 24 wherein said calibration tab is formed in one piece with said base and extends from said base and forms a backstop to block movement of said movable member in a first direction along said guide surface.

14. An apparatus as defined in claim 13 wherein said calibration tab comprises a first portion and a second portion projecting from said first portion toward said movable member to provide point contact between said movable member and said calibration tab.

15. An apparatus as defined in claim 12 wherein said apparatus further comprises means for diagnosing band breakage including a diagnostic contact, said base including means defining a second slot in said first base portion through which said diagnostic contact extends to contact said band.

16. An apparatus comprising:
a movable member;
a base having a guide surface thereon defining a path for movement of said movable member, said movable member being movable along said guide surface from a first position to a second position due to a force acting on said movable member;
a band of flexible, electrically conductive material at least partially encircling said movable member, said band extending in opposite directions away from said movable member and having opposite ends welded to said base; and an electrically conductive member disposed in the path of movement of said movable member at a location spaced from said band when said movable member is in said first position, said band having a portion which contacts said conductive member to complete a circuit for electrical current to flow through said conductive member and said band when said movable member is in said second position.

17. An apparatus as defined in claim 16 wherein said band is welded to said base at a location on the side of said base opposite from said roller such that a force acting to pull said movable member and said band away from said base tensions said band and applies shear forces to said weld.

18. An apparatus as defined in claim 17 wherein said band is welded to said base underneath said base.

19. An apparatus as defined in claim 17 further comprising a chassis to which said base is attached, said base comprising a piece of sheet metal having first and second base portions spaced from each other, said first base portion being spaced from said chassis and having said guide surface thereof facing away from said chassis and having means defining a first slot in said first base portion through which said conductive member extends into the path of movement of said movable member, said second base portion being fixed to said chassis and said band being fixed to said second base portion, said base further comprising curved third base portion connecting said first and second base portions at one end thereof, and a fourth base portion attached to the other end of said first base portion and fixed to said chassis.

20. An apparatus as defined in claim 19 wherein said base includes a calibration tab bendable relative to said base to at least partially define said first position of said movable member, said calibration tab extending from said base and forming a backstop to block movement of said movable member in a first direction along said guide surface.

21. An apparatus as defined in claim 20 wherein said calibration tab comprises a first portion and a second portion projecting from said first portion toward said movable member to provide point contact between said movable member and said calibration tab.

22. An apparatus as defined in claim 19 further comprising means for diagnosing band breakage including an electrically conductive diagnostic contact, said base including means defining a second slot in said first base portion through which said diagnostic contact extends to contact said band.

* * * * *

UNITED STATES PATENT AND TRADEMARK OFFICE
CERTIFICATE OF CORRECTION

PATENT NO. : 4,985,604
DATED : January 15, 1991
INVENTOR(S) : Yosufi M. Tyebkhan It is certified that error appears in the above-identified patent and that said Letters Patent is hereby corrected as shown below:

Column 7, Line 47, Claim 11, insert --,-- after "flexible".

Column 8, Line 43, Claim 13, change "24" to --12--.

Column 9, Line 27, Claim 19, change "thereof" to --thereon--.

Signed and Sealed this

Thirtieth Day of June, 1992

*Attest:*

DOUGLAS B. COMER

*Attesting Officer*     *Acting Commissioner of Patents and Trademarks*